May 26, 1970 J. C. DAVILA 3,513,485
PROSTHETIC HEART VALVE ASSEMBLY
Filed April 14, 1967 3 Sheets-Sheet 1
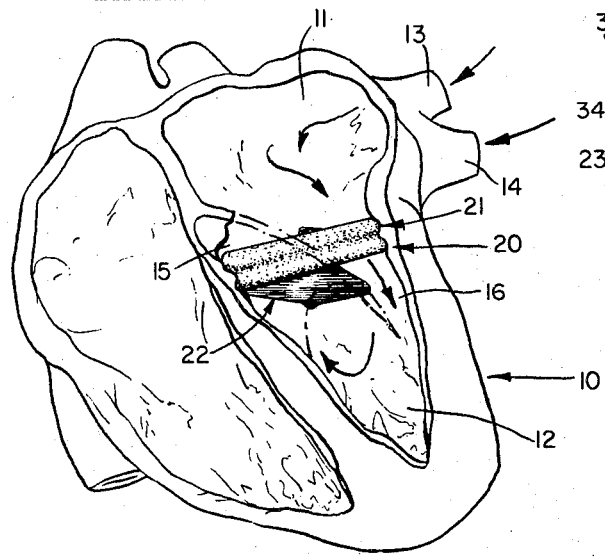
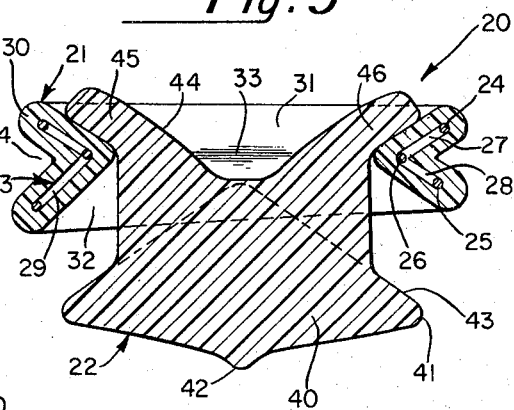
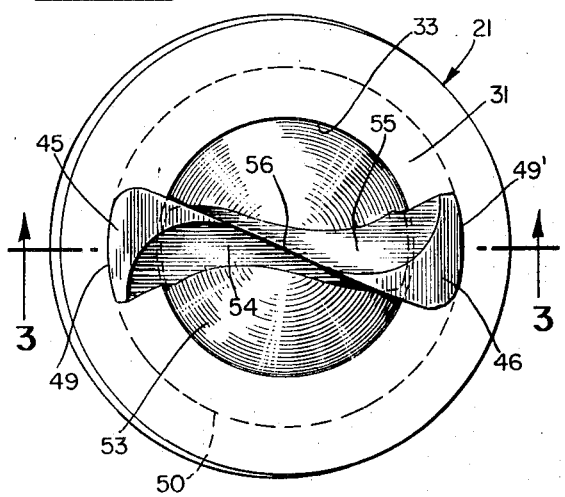
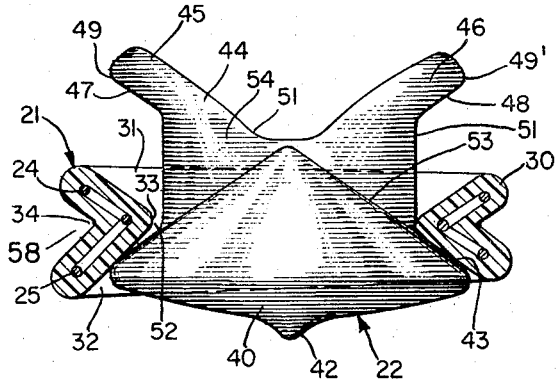
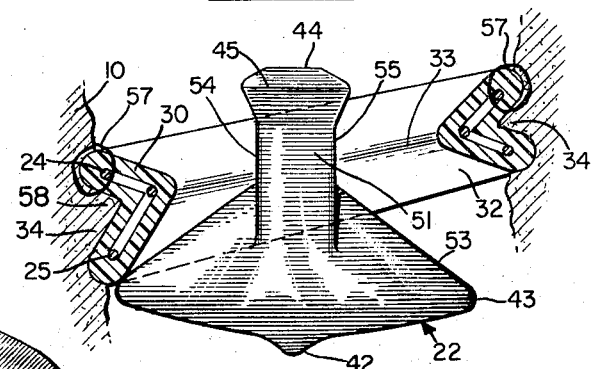
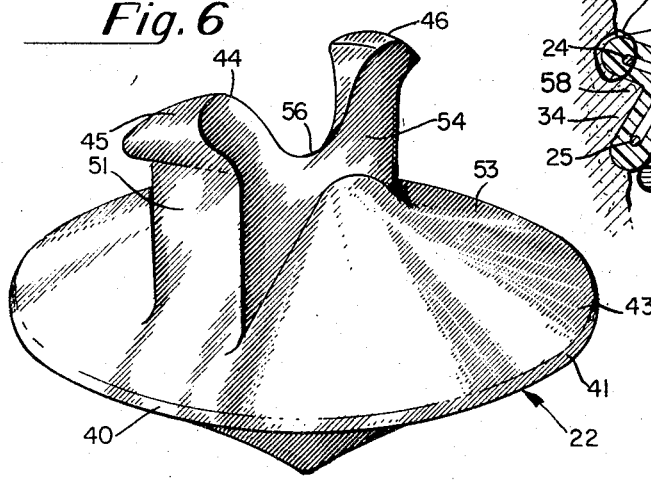
INVENTOR.
JULIO C. DAVILA
BY
Paul & Paul
ATTORNEYS.

May 26, 1970   J. C. DAVILA   3,513,485
PROSTHETIC HEART VALVE ASSEMBLY
Filed April 14, 1967   3 Sheets-Sheet 2
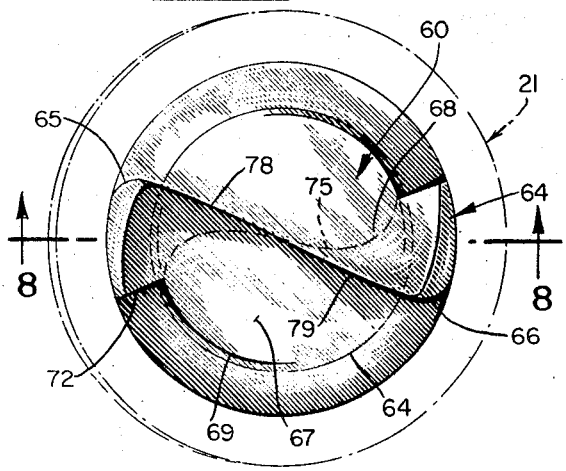
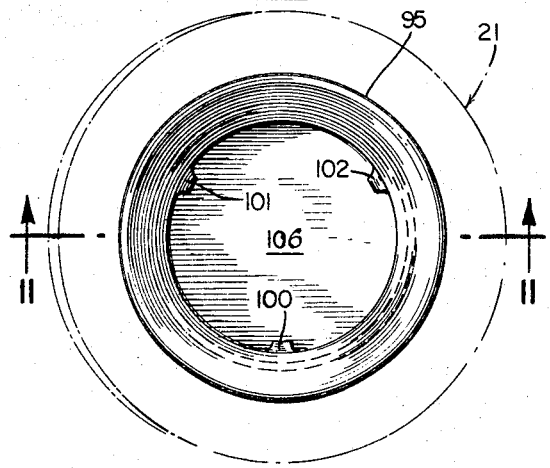
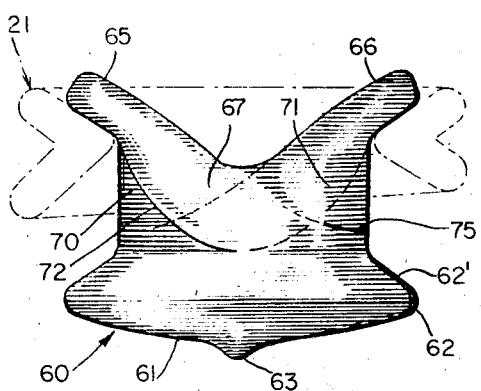
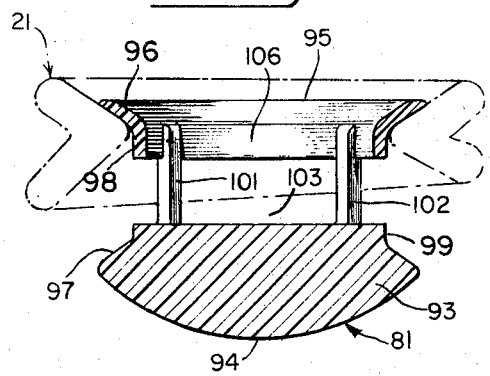
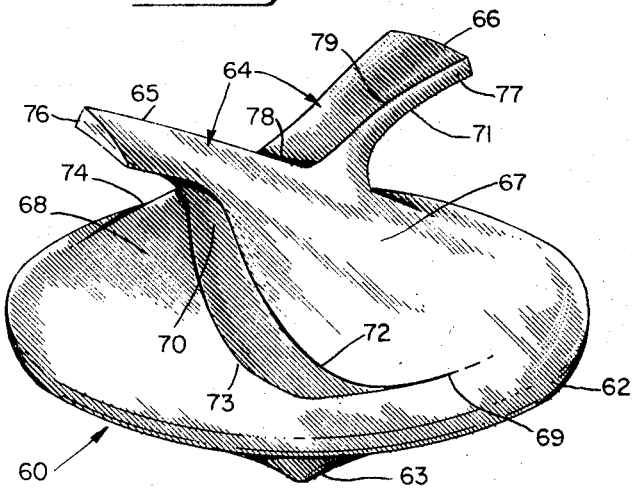
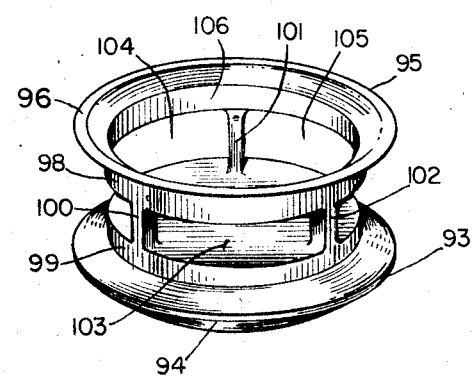
INVENTOR.
JULIO C. DAVILA
BY
Paul + Paul
ATTORNEYS.

May 26, 1970 J. C. DAVILA 3,513,485
PROSTHETIC HEART VALVE ASSEMBLY
Filed April 14, 1967 3 Sheets-Sheet 3
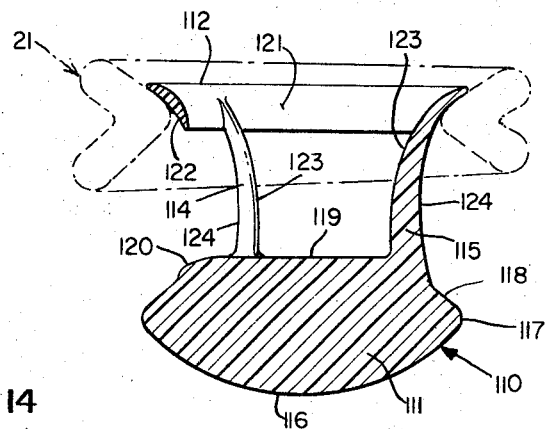
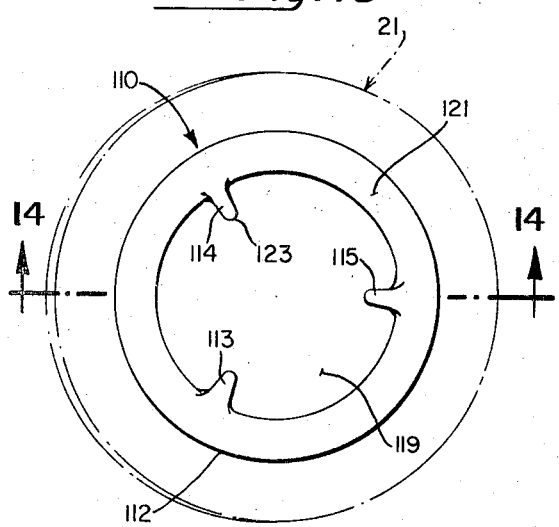
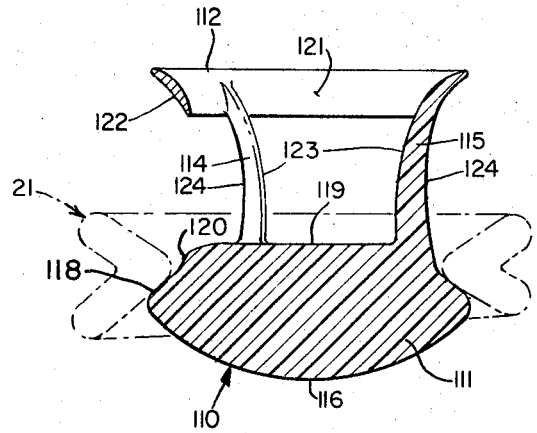
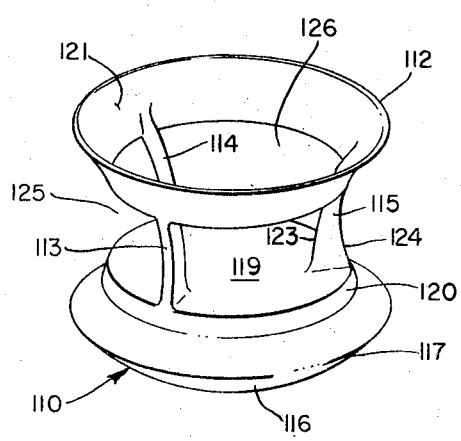
INVENTOR.
JULIO C. DAVILA
BY
Paul + Paul
ATTORNEYS.

United States Patent Office 3,513,485
Patented May 26, 1970

3,513,485
PROSTHETIC HEART VALVE ASSEMBLY
Julio C. Davila, Malvern, Pa., assignor to Temple University School of Medicine, Philadelphia, Pa., a corporation of Pennsylvania
Filed Apr. 14, 1967, Ser. No. 631,040
Int. Cl. A61f 1/22
U.S. Cl. 3—1         14 Claims

ABSTRACT OF THE DISCLOSURE

The prosthetic mitral valve assembly can be implanted in the human heart as a substitute for the natural valve, enabling the heart to function thereafter substantially normally. The prosthetic assembly consists primarily of a fixation ring or valve seat element, preferably of felted fiber of synthetic plastic, and an occluder or moving valve element which is preferably a substantially solid molded part of synthetic plastic. Several forms are disclosed.

BACKGROUND OF THE INVENTION

The invention relates to prosthetic devices and particularly to a prosthetic mitral heart valve assembly.

It has been found that in many cases diseased or defective valves in the hearts of animals, and particularly in the human heart, can be removed by surgery and replaced by prosthetic or artificial valves. In many of these cases, the patient has continued to live for many years.

Examinations and test results have indicated that several important factors have great influence upon whether or not the implanted prosthetic heart valve will operate successfully for a satisfactory long period of time. It is of primary importance that the implant be accepted by the natural heart tissue and ultimately secured in place by the growth of tissue around the fixed portion of the implant, while all parts exposed to blood should remain bare of tissue cover and substantially free from attachment to tissues, surfaces, or masses of material within the blood stream. In other words, it is important that the fixation ring or valve seat member of the prosthetic device be accepted by the natural heart tissue and ultimately secured in place by the growth of tissue thereabout, while the occluder or moving valve element which comes into contact with the blood supply remain free of the deposition of fibrin or the formation of clots. The latter process is referred to as thrombosis. Thrombosis is necessary in order to effect repair of injured tissues. Fibrin or clot forms the base or matrix into which scar tissue grows. Accordingly, thrombosis is relied upon to serve as the initial adhesive for fastening the fixation ring of the prosthetic valve in place, assisted by initial suturing. If, however, thrombosis or clot should develop in an uncontrolled pattern, the mass of clot may impair the function of the valve, at least on some occasions. Parts of the clot may break off, form emboli, and cause serious circulatory obstruction in the heart muscle, brain, or other vital organs, and may result in grave complications or death.

Another factor which must be taken into consideration in the design and implantation of a prosthetic heart valve is the hydraulic flow through the valve. The prosthetic valve must be of such design that it offers low resistance to flow, that stagnation areas are avoided, and that blood flows freely over all portions of the implant both upstream and downstream of the valve.

While all of the foregoing factors apply generally to prosthetic valves implanted in the human heart, they are of particular consequence when applied to a prosthetic mitral valve, the mitral valve being the valve between the atrium and the ventricle on the left side of the heart. The flow is from the atrium to the ventricle. When the ventricle contracts, the resulting pressure closes the mitral valve and blood is pumped outwardly to the arteries which supply the body. When the ventricle relaxes and expands, the reduction in pressure opens the mitral valve and blood flows from the atrium into the ventricle.

SUMMARY OF THE INVENTION

The present invention provides a prosthetic valve assembly which is especially designed for implantation in the human heart as a prosthetic mitral valve. The new prosthetic valve assembly is so constructed as to be capable of obtaining total capture of tissue around the fixation ring or valve seat without generating undesirable thrombosis which will impair the functioning of the prosthetic valve. All parts of the valve exposed to blood are designed to remain bare of tissue cover and substantially free from attachments to tissues or surfaces or masses of material within the blood stream.

The design and construction of the new prosthetic valve assembly is such as to promote smooth unrestricted streamlined hydraulic flow for blood when passing through the valve, thereby avoiding or at least minimizing objectioinable stagnation areas.

The new prosthetic mitral valve is so designed as to be capable of quick implantation with a maximum expectation of permanent incorporation in the normal functioning of the heart. It is designed to be more accurately fitted into the portion of the heart from which the normal mitral valve has been removed by surgery, and it may readily be sutured into position.

The new valve is so designed as to be adapted for manufacture with dependability as to shape, size, and quality of material, so as to insure as nearly as possible success of implantation. It has a minimum of bulk, thereby simulating more closely the natural mitral valve.

The new prosthetic mitral heart valve is self-guiding, self-suspending, cageless, and hypobaric. The design and geometry of the new valve allows complete periorificial contact, and acts mechanically to wipe the surface over which the blood flows, preventing undesirable proliferation of scar and allowing a substantially large orifice to be provided for a given heart.

BRIEF DESCRIPTION OF THE DRAWINGS

FIG. 1 is a sectional view depicting a human heart showing the prosthetic mitral valve installed therein;

FIG. 2 is a plan view of the upstream side of the valve assembly;

FIG. 3 is a sectional view of the valve assembly showing the occluder or valve element in open position;

FIG. 4 is a view of the valve assembly showing the fixation ring in section and showing the occluder or valve element in full and in closed position;

FIG. 5 is a view of the valve assembly showing the fixation ring in section and slightly canted, illustrating a typical position of the fixation ring in heart tissue, and showing the occluder or valve element in full and in half-open position;

FIG. 6 is a perspective view of the occluder or valve element looking at the upstream side;

FIG. 7 is a plan view of a second form of the invention;

FIG. 8 is a view along the line 8—8 of FIG. 7, showing the valve element in full and in open position, and showing the fixation ring in section;

FIG. 9 is a perspective view of the occluder or valve element of FIGS. 7 and 8;

FIG. 10 is a plan view of a third form of the invention;

FIG. 11 is a sectional view on the line 11—11 of FIG. 10, showing the occluder or valve element in open position;

FIG. 12 is a perspective view of the occluder or valve element of FIGS. 10 and 11;

FIG. 13 is a plan view of a fourth form of the invention;

FIG. 14 is a sectional view on the line 14—14 of FIG. 13 showing the valve element in open position;

FIG. 15 is a view similar to FIG. 14 but showing the valve element in closed position;

FIG. 16 is a perspective view of the occluder or valve element of FIGS. 13, 14, and 15.

DESCRIPTION OF THE PREFERRED EMBODIMENTS

FIG. 1 illustrates a section of the human heart, indicated generally by the reference character 10, exposing the left atrium 11 and left ventricle 12. Pulmonary veins 13 and 14 are those veins through which blood passes from the lungs to the heart. The natural mitral or bicuspid valve is normally located at the area generally by the reference character 15 with portions of its operating parts extending down into the left ventricle at about the area 16. The prosthetic mitral heart valve assembly, indicated generally by the reference character 20, is shown implanted in place of the natural mitral or bicuspid valve. Blood flows into the left atrium 11 through the pulmonary veins 13 and 14 in the direction of the arrows, thence through the prosthetic heart valve 20 into the left ventricle, from which it is pumped through the aortic valve, not shown in FIG. 1, but which is in communication with the left ventricle 12.

The prosthetic mitral valve assembly 20 consists primarily of a fixation ring 21, functioning as the valve seat element, and an occluder 22, functioning as the moving valve element.

Referring now to FIGS. 2–5, the fixation ring 21 consists of a relatively stiff inflexible skeletal core or reinforcement 23 consisting of a circumferential loop 24 on the upstream side, a somewhat similar circumferential loop 25 on the downstream side, and an inner circumferential loop 26. These loops are interconnected to each other by a truss work of rods 27 and 28. It is significant to note that the loop 25 is somewhat larger than the loop 24 and in nonparallel arrangement such that the truss work of rods at the location 29 is somewhat longer than those at the location 28, thus making the left side of the skeletal reinforcement as viewed in FIG. 3 wider than at the right side.

Encapsulating the skeletal reinforcement is a mass of felted fiber 30. Good results have been found to accompany the employement of a relatively heavily matted fiber of synthetic plastic material, wherein the fiber strands are from about .002 to about .0002 inch in diameter and of relatively long fiber stock. Among the synthetic plastics found acceptable are polypropylene, high density polyethylene, and those identified by the commercial names of Dacron and Teflon. It is further significant to note that the form of the skeletal reinforcement 23, when encapsulated with the felted fiber 30, has the form of a ring of irregular thickness, and includes an outwardly flared section 31 facing upstream and an outwardly flared section 32 facing downstream, the sections 31 and 32 joining at a passage 33 of minimum diameter with a somewhat rounded junction. On its exterior periphery, the fixation ring is provided with a V-shaped circumferential recess 34.

Referring now to FIGS. 2–6, the occluder or moving valve element 22 is a substantially solid molded part, preferably of an acceptable synthetic plastic material such as polypropylene or one of the commercial types known as Marlex. The downstream end 40 of the occluder has a circumference 41 of maximum diameter, substantially larger than the diameter of the circular passage 33. At its midpoint, the downstream end 40 projects outwardly to a somewhat rounded point 42. An annular flared portion 43 is complementary to the outwardly flared section 32.

The upstream end 44 of the occluder consists, in the embodiment shown in FIGS. 2–6, of two fingers 45 and 46 having inclined under edges 47 and 48 (FIG. 4) having slopes substantially complementary to the slope of the flared section 31. The outermost ends 49 and 49' of the fingers 45 and 46 lie on a circumference indicated in FIG. 2 by the reference character 50 having a diameter substantially greater than the circular passage 33 and approaching the diameter of the widest portion of the outwardly flared section 31.

An intermediate portion 51, joins the downstream end 40 with the upstream end 44. The transverse dimension of portion 51 is sufficiently less than the diameter of the passage 33 to leave a comfortable clearance 52 (FIG. 4).

To promote a streamlined and unobstructed hydraulic flow past the occluder 22 when in open position, the upstream face of the downstream end 40 has a substantially frusto-conical surface 53 which may be inclined at substantially the same angle as the annular flared portion 43. In addition, the opposite faces 54 and 55 of the intermediate portion 51 are smoothly curved, as best seen in FIG. 2, the curvature being generally concave along one side of the axial centerline and generally convex on the other side of the axial centerline, the curvature extending to the upstream edges of the fingers 45 and 46. On the same side of the axial centerline, the opposite faces 54 and 55 are oppositely curved, one being concave and the other convex. It is also significant to note that the curvature of the faces 54 and 55 near the upstream edges of the fingers 45 and 46 is at a smaller radius than the curvature of the intermediate section 51 where it joins the frusto-conical surface 53. Also, at the junction 56 of the fingers 45 and 46 the curvature of the opposite faces is such as to bring the upstream edges almost together, forming substantially a rounded knife edge at 56.

The above described and illustrated arrangement of curved surfaces, which characterizes the occluder 22, is effective to divide in a smooth manner the flow of blood on the upstream side of the prosthetic mitral valve assembly. The result is a substantially evenly divided smooth streamlined flow over the occluder 22 when in the opened position of FIG. 3 or FIG. 5, or for that matter in any open position. Due to the curved configuration, there will be no abrupt change in the direction of flow, thereby minimizing the prospect of stagnation areas in the blood stream in the vicinity of the prosthetic mitral valve.

The knife edge 56 and the curved surfaces 54 and 55 allow the occluder 22 to move through the blood with a minimum of resistance, thereby facilitating closing of the valve.

Also, the peculiar double-curved configuration of the upstream end 44 and intermediate portion 51 clearly seen in FIGS. 2 and 6 and described above, causes the occluder 22 to turn rotationally about its center axis (clockwise as viewed in FIG. 2) as it moves in both valve-closing and valve-opening directions when tested in vitro. The rotational movement of the occluder is intended to provide a wiping action to take place between the surface 53 and the annular flared surface 32 of the fixation ring and since this rotational movement is in the same direction of rotation irrespective of whether the occluder 22 is moving from closed to open position or from open to closed position, the wiping action covers the complete annular band (360°) and prevents or at least minimizes the possibility of excessive proliferation of scar in this region.

When, after cutting away the natural mitral valve, the prosthetic mitral valve 20 is implanted in the heart 10, satures 57 (FIG. 5) are initially passed through the tissues of the heart muscle and through the felted fiber 30, either through the fibrous portion alone or around one or another of the loops 24 or 25. The incision in the heart itself is made such that some portion 58 of the tissue of the heart will be lodged within the V-shaped recess 34, as shown in FIG. 5, to thereby assist in anchoring the fixation ring in proper position until thrombosis develops to the point where scar tissue will entwine the fibers of the felted encapsulation and in turn encapsulate the fibers.

Because of the natural configuration of the interior of the heart and the muscle construction of the wall of the atrium and ventricle, a better fit is achieved when the fixation ring 21 is given the unbalanced thickness shown and described. Moreover, the shape of the occluder 22 is such that adequate and sufficient flow will be provided even though the movement of the occluder 22 is not precisely along the center axis of the fixation ring 21. For example, FIG. 5 illustrates a typical position of a fixation ring in the heart 10, and a typical position of the occluder in open position.

In the form of invention illustrated in FIGS. 7, 8, and 9, the fixation ring 21 is in the same form as described in connection with FIGS. 2 through 6. Only the occluder is different. In FIGS. 7–9, the occluder 60, although having a downstream end 61 similar to the form of FIGS. 3 through 6, is shaped differently at the upstream end 64. As shown in FIG. 8, fingers 65 and 66 overlie the outwardly flared section 31 of the fixation ring 21, and function to limit the downstream movement of the occluder at full open position. In closed position, the flared section 62' of the occluder, which faces upstream, engages the flared section 32 of the fixation ring 21.

The upstream faces 67 and 68 of the fingers 65 and 66 have a slightly diverging warped surface configuration which becomes tangent to the surface 62' of the occluder at the circumferential line 69 inwardly of the circumference 62. The fingers 65 and 66 have deeply undercut portions 70 and 71 respectively, the undercut portion 70 joining the upstream face 67 along a relatively sharp edge 72 and joining the opposite upstream face 68 at the bottom of a recess 73. Similarly, the undercut portion 71 joins the upstream face 68 along a line 74 and joins the upstream face 67 at the bottom of a recess 75. The fingers are faced off along surfaces 76 and 77, respectively, the surfaces having relatively sharply defined edges 78 and 79.

Shaped as illustrated in FIGS. 7–9, and as described above, the upstream faces 67 and 68 and the undercut portions 70 and 71 provide a relatively wide unobstructed opening for blood as it flows through the valve device when the occluder is in the open position shown in FIG. 8.

As in the case of the design of FIGS. 2–6, the design of the occluder of FIGS. 7–9 provides a smooth division in the flow of blood through the open valve, and allows the occluder to move through the blood with a minimum of resistance. This is apparent from FIG. 2 wherein the sharply defined knife edges 78 and 79 are clearly visible. It is also apparent, from FIG. 7, that as the occluder 60 is moved up and down, in response to the pressure forces developed by the ventricle, to close and to open the valve, the occluder will turn rotationally about its center axis, in the clockwise direction as viewed in FIG. 7. Thus, the occluder 60 of FIG. 7 will provide a wiping action similar to that of the occluder of FIGS. 2–6, thereby to avoid or minimize the possibility of clot formation.

FIGS. 10–12 illustrate a third form of occluder 81, the fixation ring being similar to that of FIGS. 2–5 and 7–8. In FIGS. 10–12, the occluder 81 is provided at the downstream end with a relatively solid head 93 of appreciable thickness, having a semispherical downstream face 94. A stop ring 95 at the upstream end has an outwardly flared section 96 which overlies the frusto-conical flared section of the fixation ring and limits the axial movement of the occluder 81 at the open position, shown in FIG. 11. An upstream-facing flared section 97 of the head 93 limits movement of the occluder in closed position. An annular cylindrical section 98 of the stop ring 95 has such an outside diameter that the section 98 provides a wiping action between itself and the edge of the circular passage of the fixation ring, and serves as a guide for the occluder when moving into the open position. A similar annular cylindrical section 99 on the head 93 has a comparable diameter and serves as a guide for the head when moving up into closed position.

Three legs 100, 101, and 102 interconnect the stop ring 95 and the head 93. The legs are relatively small in cross-sectional area in order to provide a relatively maximum amount of space between the legs, and are of a length to provide passages 103, 104, 105 of ample area for blood to flow through the central passageway 106 and out the passages 103–105 when the occluder is in open position.

FIGS. 13–16 illustrate yet another form of occluder, the fixation ring being similar to that of FIGS. 2–5. In FIGS. 13–16, the occluder, indicated generally by the reference character 110, is formed by a head 111, a stop ring 112, and three interconnecting legs 113, 114, and 115 spaced 120° apart. The head has a semispherical downstream face 116 terminating at a circumference 117 which has a gently rounded configuration, tangent to the surface 116 and also tangent to an annular frusto-conical upstream-facing surface 118 of the head. The head has upstream-facing flat face 119 having an annular curved edge section 120 connecting the flat face 119 with the surface 118.

The stop ring 112 has a streamlined curved inside annular face 121 which forms a passageway through the stop ring. An outside annular flared face 122 is adapted, when the occluder is in open position, to engage the frusto-conical flared section of the fixation ring, and to function as a limit stop for movement of the occluder 110 to full open position, as illustrated in FIG. 14. In closed position, as shown in FIG. 15, the upstream-facing surface 118 is brought against the frusto-conical flared section on the downstream side of the fixation ring. It will be noted that there is a comfortable clearance between the circular passage through the fixation ring and the edge section 120 of the head 111.

The legs 113, 114, 115 are relatively small in cross-sectional area at the top where they join with the stop ring 112 and become progressively larger in cross-sectional area as they approach the head 111. It is also significant to note that along their inside edges 123 the legs are tapered to a rounded sharpness, and that the legs becoming progressively thicker from the inside edges 123 outwardly, reaching their greatest width midway between the inside edge 123 and outside edge 124. From the widest center portion, the legs taper progressively inwardly terminating in a gently rounded outside edge 124 in each instance. Shaped in this fashion the legs provide a minimum of impediment to the flow of blood outwardly past the legs when the occluder is in open position.

While the prosthetic valve has been described as particularly suitable for use as a mitral heart valve, it is to be understood that the valve may be adapted to the tricuspid and/or aortic valves of the heart.

Having described the invention what is claimed is:

1. A prosthetic heart valve comprising:
    (a) a fixation ring of generally circular configuration having a passage therethrough which is substantially circular in cross section;
    (b) an occluder extending through said fixation-ring passage and movable therein between closed and open positions;
    (c) said occluder having an upstream end larger in diameter than said fixation-ring passage to limit movement of the occluder to full open position;
    (d) said occluder having a downstream end larger than said fixation-ring passage and adapted to seat on said fixation ring, whereby to close the fixation-ring passage against reverse flow;
    (e) said occluder having an intermediate portion smaller than said fixation-ring passage, whereby to enable flow through said passage in the open position of said occluder;
    (f) said upstream end of said occluder having inclined curved surfaces curved in opposing directions on opposing sides of the center axis of said occluder, forming a continuous common edge portion between said curved surfaces to define a propeller-like blade portion which tends to cause rotation of said occluder about its center axis in response to thrust forces set up by relative axial movement between the occluder and the blood stream, said rotation of said occluder providing a wiping action between the downstream end of said occluder and the valve-seat portion of said fixation ring.

2. A prosthetic heart valve as in claim 1, wherein said fixation ring comprises a relatively stiff inflexible skeletal reinforcement and a liner of relatively soft fibrous material on the reinforcement facing and surrounding said passage, said liner having an outwardly flared section facing upstream adjacent the upstream end of the occluder and an outwardly flared section facing downstream adjacent the downstream end of said occluder.

3. A prosthetic heart valve as in claim 1, wherein the fixation ring has a relatively stiff inflexible skeletal reinforcement comprising an inner circumferential loop, an upstream circumferential loop of larger diameter than the inner loop and a downstream circumferential loop of larger diameter than the inner loop, and inter-connecting means between said loops.

4. A prosthetic heart valve as in claim 1, wherein the fixation ring has an outwardly flared entrance section on the upstream side and an outwardly flared exit section on the downstream side, the distance between the outermost edge of the exit section and the passage area of smallest diameter on one side of said exit section being greater than the distance on the opposite side of the exit section between the edge and the passage area of smallest diameter.

5. A prosthetic heart valve as in claim 2, wherein the skeletal reinforcement is completely enveloped in said liner.

6. A prosthetic heart valve as in claim 2, wherein the fibrous material of the liner comprises felted fibers of synthetic plastic material wherein individual fibers are of diameter from about .002 to about .0002 inch.

7. A prosthetic heart valve as in claim 1, wherein the upstream end of said occluder comprises fingers extending diametrically outwardly to a location outwardly relative to the area of the passage of smallest diameter, opposite faces of said fingers being curved endwardly and outwardly and adjacent surfaces of the downstream end of said occluder having a progressively outward slope whereby to provide a streamlined flow surface on the occluder devoid of abrupt changes in direction.

8. A prosthetic heart valve as in claim 1, wherein the upstream end of said occluder comprises fingers extending diametrically outwardly, upstream faces of said fingers being sloped in relatively opposite directions radially outwardly and endwardly toward the downstream side.

9. A prosthetic heart valve according to claim 8, wherein said fingers have undercut downstream faces having streamlined junctions with the upstream faces.

10. A prosthetic heart valve according to claim 1 characterized in that each of said inclined curved opposing surfaces at the upstream end of said occluder is characterized by having a smaller radius near the radially outward end of said propeller-like blade portion and a larger radius near the center axis.

11. A prosthetic heart valve comprising:
    (a) a fixation ring of generally circular configuration having a passage therethrough which is substantially circular in cross-section;
    (b) an occluder extending through said fixation-ring passage and movable therein between closed and open positions;
    (c) said occluder having an upstream end larger in diameter than said fixation-ring passage to limit movement of the occluder to full open position;
    (d) said occluder having a downstream end larger than said fixation-ring passage and adapted to seat on said fixation ring, whereby to close the fixation-ring passage against reverse flow;
    (e) said occluder having an intermediate portion smaller than said fixation-ring passage, whereby to enable flow through said passage in the open position of said occluder;
    (f) said upstream end of said occluder including an annular stop ring larger in diameter than said fixation-ring passage and having an axial passageway through said stop ring;
    (g) said downstream end of said occluder having a head larger in diameter than said fixation-ring passage;
    (h) said intermediate portion of said occluder comprising a plurality of spaced legs interconnecting said annular stop ring and said head and forming radial passageways between said legs in communication with said axial passageway;
    (i) said stop ring having an annular dependent portion the outside diameter of which is slightly smaller than the diameter of said fixation-ring passage for guiding said occluder into open position.

12. A prosthetic heart valve according to claim 11, wherein said legs have a cross-sectional shape which is progressively wider from an inside edge toward a midportion and progressively narrower from said midportion to an outside edge for minimizing hydraulic resistance.

13. A prosthetic heart valve comprising:
    (a) a fixation ring of generally circular configuration having a passage therethrough which is substantially circular in cross-section;
    (b) an occluder extending through said fixation-ring passage and movable therein between closed and open positions;
    (c) said occluder having an upstream end larger in diameter than said fixation-ring passage to limit movement of the occluder to full open position;
    (d) said occluder having a downstream end larger than said fixation-ring passage and adapted to seat on said fixation ring, whereby to close the fixation-ring passage against reverse flow;
    (e) said occluder having an intermediate portion smaller than said fixation-ring passage, whereby to enable flow through said passage in the open position of said occluder;
    (f) said upstream end of said occluder including an annular stop ring larger in diameter than said fixation-ring passage and forming an axial passageway through said stop ring;

(g) said head of said downstream end portion of said occluder including an annular cylindrical portion slightly smaller in diameter than said fixation-ring passage for guiding said occluder into closed position.

14. A prosthetic heart valve according to claim 13, wherein said stop ring has an inside surface which is convexly curved and of progressively diminishing diameter from the upstream to the downstream edges thereof whereby to minimize hydraulic turbulence in said axial passageway.

References Cited

UNITED STATES PATENTS

| | | | |
|---|---|---|---|
| 583,972 | 6/1897 | Beavis | 137—519 XR |
| 3,374,489 | 3/1968 | Diaz | 3—1 |
| 3,396,409 | 8/1968 | Melrose | 3—1 |
| 1,381,078 | 6/1921 | Shevlin | 137—533.19 XR |
| 3,451,067 | 6/1969 | Jordan | 3—1 |

FOREIGN PATENTS

| | | |
|---|---|---|
| 1,449,117 | 7/1966 | France. |
| 1,016,811 | 1/1966 | Great Britain. |

OTHER REFERENCES

"Prosthetic Replacement of the Mitral Valve," The Lancet, Nov. 24, 1962, p. 1087.

RICHARD A. GAUDET, Primary Examiner

R. L. FRINKS, Assistant Examiner

U.S. Cl. X.R.

137—17, 332, 519, 533